US012769419B2

(12) United States Patent
Kim

(10) Patent No.: US 12,769,419 B2
(45) Date of Patent: Oct. 20, 2026

(54) INPUT SENSING DEVICE AND DISPLAY DEVICE INCLUDING INPUT SENSING DEVICE

(71) Applicant: LG Display Co., Ltd., Seoul (KR)

(72) Inventor: Taehyung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/194,939

(22) Filed: Apr. 30, 2025

(65) Prior Publication Data

US 2026/0133652 A1 May 14, 2026

(30) Foreign Application Priority Data

Nov. 13, 2024 (KR) ........................ 10-2024-0160968

(51) Int. Cl.
*G06F 3/041* (2006.01)
*G06F 3/044* (2006.01)

(52) U.S. Cl.
CPC ...... *G06F 3/04164* (2019.05); *G06F 3/04166* (2019.05); *G06F 3/0443* (2019.05)

(58) Field of Classification Search
CPC . G06F 3/04164; G06F 3/04166; G06F 3/0443
See application file for complete search history.

(56) References Cited

U.S. PATENT DOCUMENTS

| | | | | |
|---|---|---|---|---|
| 9,223,425 | B1 | 12/2015 | Kim et al. | |
| 2012/0092028 | A1* | 4/2012 | Lee | G06F 3/044 324/658 |
| 2013/0278508 | A1* | 10/2013 | Ho | G06F 3/04166 345/173 |
| 2016/0188007 | A1* | 6/2016 | Jung | G06F 3/0442 345/173 |
| 2017/0153763 | A1* | 6/2017 | Vavra | G06F 3/0442 |
| 2018/0173342 | A1* | 6/2018 | Lee | G06F 3/044 |
| 2020/0218422 | A1 | 7/2020 | Chen et al. | |
| 2021/0004097 | A1* | 1/2021 | Park | H03H 17/0671 |
| 2021/0223935 | A1* | 7/2021 | Zhang | G06F 3/0412 |
| 2023/0229261 | A1* | 7/2023 | Iikura | G01B 7/00 345/174 |
| 2023/0400946 | A1* | 12/2023 | Yang | G06F 3/0418 |
| 2025/0055446 | A1* | 2/2025 | Bugade | H03K 3/017 |
| 2025/0155917 | A1* | 5/2025 | Saputra | G06F 1/08 |

FOREIGN PATENT DOCUMENTS

| | | |
|---|---|---|
| KR | 10-2016-0030595 A | 3/2016 |
| KR | 10-2020-0011985 A | 2/2020 |

* cited by examiner

*Primary Examiner* — Nitin Patel
*Assistant Examiner* — Amen W Bogale
(74) *Attorney, Agent, or Firm* — Morgan, Lewis & Bockius LLP

(57) ABSTRACT

In one or more examples, an input sensing device includes: a plurality of analog front end circuits configured to process touch sensing signals output from a plurality of touch electrodes to generate a sampling signal; and an analog-digital converter configured to convert the sampling signal to generate sensing data. A display device may include the input sensing device.

19 Claims, 12 Drawing Sheets

INPUT SENSING DEVICE AND DISPLAY DEVICE INCLUDING INPUT SENSING DEVICE

CROSS REFERENCE TO RELATED APPLICATION

The present application claims the benefit of and priority to Korea Patent Application No. 10-2024-0160968, filed Nov. 13, 2024, the entire contents of which are incorporated herein by reference for all purposes.

BACKGROUND

1. Technical Field

The present disclosure relates to an input sensing device and a display device including the same.

2. Description of the Related Art

With the development of an information society, various types of display devices have been developed. Recently, various types of display devices such as liquid crystal display (LCD), plasma display panel (PDP), and organic light emitting display (OLED) devices have been utilized.

Recently, a display device including a touch screen panel, which can sense an input of a touch, a hovering, and/or a gesture through a finger of the user or a stylus pen, etc., rather than through the conventional input methods such as use of a button, a keyboard, and a mouse, is widely used.

Such a display device includes an input sensing device for detecting whether there is an input and an input coordinate (a position of the input). The input sensing device may drive sensing electrodes disposed in the touch screen panel, and sense a touch input from the touch sensing signal output from the touch electrodes.

The description of the related art should not be assumed to be prior art merely because it is mentioned in or associated with this section. The description of the related art includes information that describes one or more aspects of the subject technology, and the description in this section does not limit the invention.

SUMMARY

Embodiments provide an input sensing device configured to generate a common voltage signal through a common voltage driving circuit and to apply the signal to touch electrodes, and a display device including the input sensing device.

Embodiments provide an input sensing device configured to apply an input common voltage signal in a form of a pulse which swings between a high common voltage and a low common voltage during a touch driving period, and to apply an input common voltage signal as a first voltage greater than the high common voltage during a predetermined first period after rising of a pulse and as second voltage greater than the low common voltage during a predetermined second period after falling of the pulse, and a display device including the same.

According to one or more embodiments, an input sensing device includes: at least one analog front end circuit configured to process touch sensing signals output from a plurality of touch electrodes and to generate a sampling signal; an analog-digital converter configured to convert the sampling signal and to generate sensing data; and a common voltage driving circuit configured to apply a common voltage signal to the plurality of touch electrodes.

The common voltage driving circuit may include: a signal delay circuit configured to output a delay signal by delaying an input common voltage signal by a predetermined delay time; a comparator configured to output a comparison signal by comparing the delay signal with the input common voltage signal; a buffer configured to output a high common voltage or a low common voltage in response to the comparison signal; and an output circuit configured to output the common voltage signal to an output terminal by amplifying a signal output from the buffer by a predetermined ratio.

The input common voltage signal may swing between the high common voltage and the low common voltage during a touch driving period.

The signal delay circuit may include: at least two resistors connected in series between an input end and an output end; and at least two capacitors connected in parallel between the input end and the output end.

The signal delay circuit may include: at least two transmission gates connected in series between an input end and an output end; and at least two capacitors connected in parallel between the input end and the output end.

The signal delay circuit may include: a plurality of resistors connected in series to an input end; a plurality of capacitors, each of which being connected between respective ones of the plurality of resistors; a plurality of transmission gates, each of which being connected to a respective common node to which one corresponding capacitor among the plurality of capacitors and two adjacent corresponding resistors among the plurality of resistors being connected; and a switching circuit configured to connect one transmission gate among the plurality of transmission gates to an output end.

The predetermined delay time may be set to be shorter than a pulse width of the input common voltage signal.

The comparator may include: a first comparator configured to output a first comparison signal at a first level when a voltage level of the delay signal is greater than a voltage level of the input common voltage signal and to output the first comparison signal at a second level when the voltage level of the delay signal is equal to or smaller than the voltage level of the input common voltage signal; and a second comparator configured to output a second comparison signal at the second level when the voltage level of the delay signal is smaller than the voltage level of the input common voltage signal and to output the second comparison signal at the first level when the voltage level of the delay signal is equal to or greater than the voltage level of the input common voltage signal.

The comparator may be configured as an amplifying circuit or a dynamic circuit.

The amplifying circuit may include: an input circuit including a first transistor to which the delay signal being input through a gate node, a second transistor to which the input common voltage signal being input through a gate node, and a third transistor connected between a low potential voltage node and a common node of the first transistor and the second transistor; and an amplifier configured to amplify a signal input through the first transistor and the second transistor and to output the amplified signal as the comparison signal.

In the first comparator, a size of the first transistor may be set to be greater than a size of the second transistor, and in the second comparator, a size of the second transistor may be set to be greater than a size of the first transistor.

The buffer may include: a first transistor configured to output the high common voltage to the output terminal in response to the first comparison signal being at the first level; and a second transistor configured to output the low common voltage to the output terminal in response to the second comparison signal being at the second level.

The output circuit may be configured as an amplifier having an inverting input terminal connected to the output terminal; and a non-inverting input terminal receiving the input common voltage signal, and configured to amplify a difference voltage between the inverting input terminal and the non-inverting input terminal to output the amplified difference voltage to the output terminal.

The input common voltage signal may swing between the high common voltage and the low common voltage during a touch driving period, and the input common voltage signal may be applied as a first voltage greater than the high common voltage during a predetermined first period after rising of a pulse and is applied as a second voltage greater than the low common voltage during a predetermined second period after falling of the pulse.

According to one or more embodiments, a display device includes: a touch panel on which a plurality of touch electrodes are disposed; and a touch driving circuit configured to process touch sensing signals output from the plurality of touch electrodes to generate a sampling signal.

The touch driving circuit may include: a plurality of analog front end circuits configured to process the touch sensing signals and to generate the sampling signal; an analog-digital converter configured to convert the sampling signal and to generate sensing data; and a common voltage driving circuit configured to apply a common voltage signal to the plurality of touch electrodes.

The common voltage driving circuit may include: a signal delay circuit configured to output a delay signal to an output terminal by delaying an input common voltage signal by a predetermined delay time; a comparator configured to output a comparison signal by comparing the delay signal with the input common voltage signal; a buffer configured to output a high common voltage or a low common voltage in response to the comparison signal; and an output circuit configured to amplify a signal output from the buffer by a predetermined ratio and to output the amplified signal as the common voltage signal.

The input common voltage signal may swing between the high common voltage and the low common voltage during a touch driving period.

The signal delay circuit may include: at least two resistors connected in series between an input end and an output end; and at least two capacitors connected in parallel between the input end and the output end.

The comparator may include: a first comparator configured to output a first comparison signal at a first level when a voltage level of the delay signal is greater than a voltage level of the input common voltage signal and to output the first comparison signal at a second level when the voltage level of the delay signal is equal to or smaller than the voltage level of the input common voltage signal; and a second comparator configured to output a second comparison signal at the second level when the voltage level of the delay signal is smaller than the voltage level of the input common voltage signal and to output the second comparison signal at the first level when the voltage level of the delay signal is equal to or greater than the voltage level of the input common voltage signal.

The signal delay circuit may include: an input circuit including a first transistor to which the delay signal being input through a gate node, a second transistor to which the input common voltage signal being input through a gate node, and a third transistor connected between a common node of the first transistor and the second transistor and a low potential voltage node; and an amplifier configured to amplify a signal input through the first transistor and the second transistor and to output the amplified signal as the comparison signal.

In the first comparator, a size of the first transistor may be set to be greater than a size of the second transistor, and in the second comparator, a size of the second transistor may be set to be greater than a size of the first transistor.

The buffer may include: a first transistor configured to output the high common voltage to the output terminal in response to the first comparison signal being at the first level; and a second transistor configured to output the low common voltage to the output terminal in response to the second comparison signal being at the second level.

The output circuit may be configured as an amplifier having an inverting input terminal connected to the output terminal; and a non-inverting input terminal receiving the input common voltage signal, and configured to amplify a difference voltage between the inverting input terminal and the non-inverting input terminal to output the amplified difference voltage to the output terminal.

The input common voltage signal may be applied in a form of a pulse which swings between the high common voltage and the low common voltage during a touch driving period, and the input common voltage signal may be applied as a first voltage greater than the high common voltage during a predetermined first period after rising of the pulse and is applied as second voltage greater than the low common voltage during a predetermined second period after falling of the pulse.

The input sensing device and the display device including the same according to one or more embodiments allow a common voltage signal to be applied with respect to touch electrodes in the entire region of a large scale display device.

In addition, the input sensing device and the display device including the same according to one or more embodiments may improve a rising time delay and a falling time delay of the common voltage signal substantially applied to the touch electrodes.

Moreover, the input sensing device and the display device including the same according to one or more embodiments may improve the accuracy of the touch sensing by driving the touch electrode in a desired voltage level without a time delay.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure.

Figure 1:
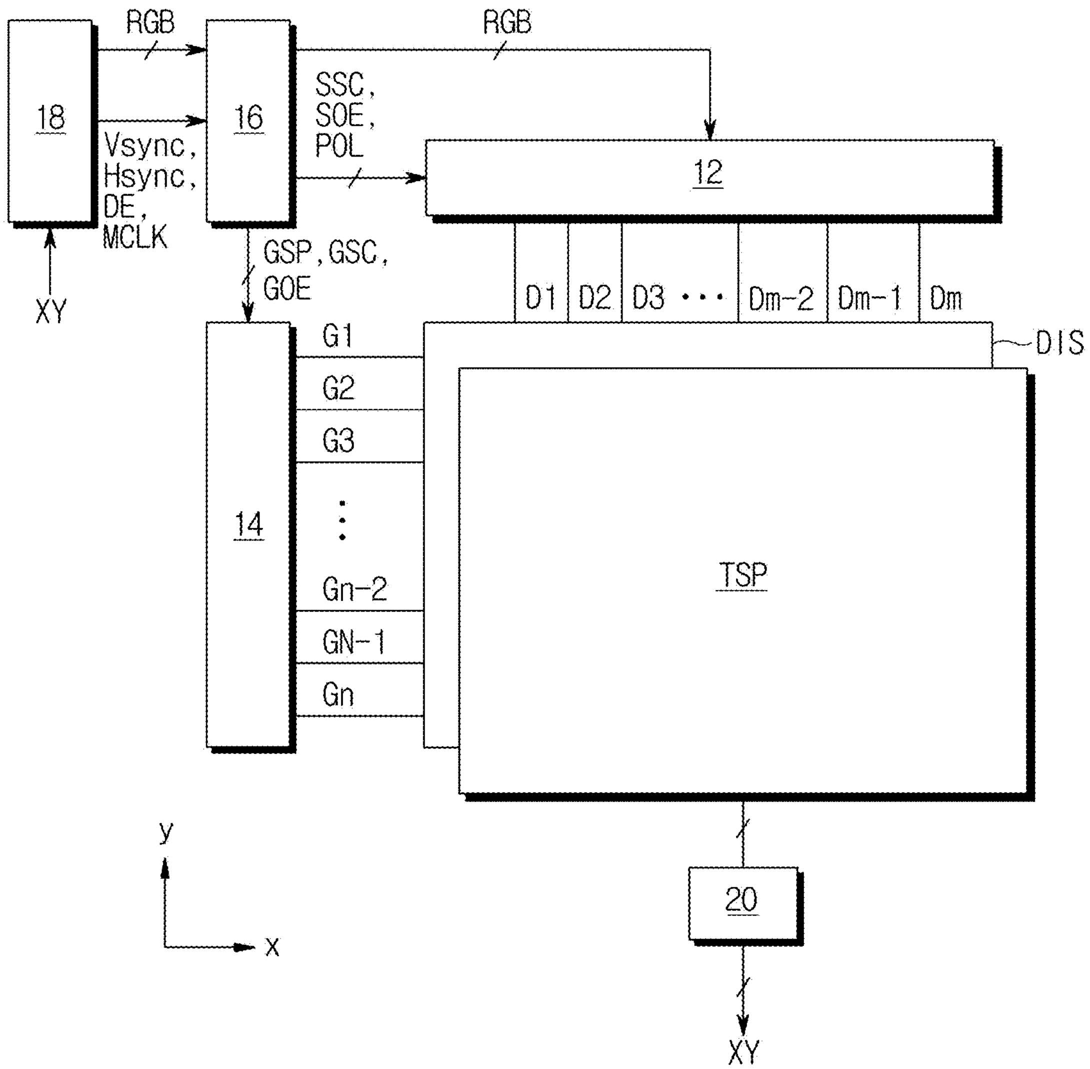
FIG. 1 is a block diagram illustrating a configuration of a display device according to an embodiment.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Hereinafter, embodiments of the disclosure will be described with reference to the drawings. In this specification, when it is mentioned that a component (or, an area, a layer, a part, etc.) is referred to as being "on," "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the disclosure. The singular expressions include plural expressions unless the context clearly dictates otherwise. For example, an element may be one or more elements. An element may include a plurality of elements. By way of non-limiting examples, a signal may be one or more signals, a circuit may be one or more circuits, a comparator may be one or more comparators, an amplifier may be one or more amplifiers, a buffer may be one or more buffers, an input circuit may be one or more input circuits, an output circuit may be one or more output circuits, a signal delay circuit may be one or more signal delay circuits, an analog front end circuit may be one or more analog front end circuits, an analog-digital converter may be one or more analog-digital converters, and a common voltage driving circuit may be one or more common voltage driving circuits unless the context clearly dictates otherwise.

The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

In addition, terms such as "below," "the lower side," "on," and "the upper side" are used to describe a relationship of configurations shown in the drawing. The terms are described as a relative concept based on a direction shown in the drawing.

In various embodiments of the disclosure, the term "include," "comprise," "including," or "comprising," specifies a property, a fixed number, a step, a process, an element and/or a component, or a combination thereof, but does not exclude presence or addition of other properties, fixed numbers, steps, processes, elements and/or components, or a combination thereof.

FIG. 1 is a block diagram illustrating a configuration of a display device according to an embodiment.

Referring to FIG. 1, a display device according to an embodiment may include a driving circuit and a display panel DIS.

The driving circuit is configured to control light emission of pixels disposed in the display panel DIS, and includes a data driving circuit 12, a scan driving circuit 14, and a timing controller 16.

The data driving circuit 12 may generate data voltages by converting digital video data RGB output from the timing controller 16 into analog voltages. The data driving circuit 12 may provide the generated data voltages to pixels of the display panel DIS through a plurality of data lines D1 to Dm.

The scan driving circuit 14 may provide a gate pulse (or a scan pulse) synchronized with the data voltage to gate lines G1 to Gn sequentially.

The timing controller 16 controls an operation timing of the data driving circuit 12 and the scan driving circuit 14 based on timing signals such as a vertical synchronization signal Vsync, a horizontal synchronization signal Hsync, a data enable signal DE, and a main clock MCLK input from a host system 18.

The timing controller 16 generates a data timing control signal based on the timing signal and applies the signal to the data driving circuit 12. The data timing control signal includes a source sampling clock SSC, a polarity control signal POL, a source output enable signal SOE, and the like.

The timing controller 16 generates a scan timing control signal based on the timing signal and applies the signal to the scan driving circuit 14. The scan timing control signal includes a gate start pulse GSP, a gate shift clock GSC, a gate output enable signal GOE and the like.

The host system 18 may be one among a television system, a set top box, a navigation system, a DVD player, a blue-ray player, a personal computer (PC), a home theater system, and a phone system, but is not limited thereto. The host system 18 includes an SoC (System on chip) embedded with a scaler, and converts digital video data RGB of an input video into a format suitable for display in the display panel DIS. The host system 18 transmits the timing signals (Vsync, Hsync, DE, MCLK) together with digital video data to the timing controller 16. In addition, the host system 18 may implement an application program related with coordinate information XY input from a sensing driving circuit 20.

In the display panel DIS, a plurality of pixels (or, referred to as sub-pixels) are disposed. For example, the pixels may be disposed in a matrix form in the display panel DIS. The pixels PX disposed in one pixel row are connected to the same gate line (G1 to Gn), and the pixels PX disposed in one column are connected to the same data line (D1 to Dm). The pixels PX may emit light at luminance corresponding to the gate pulse and a data voltage supplied through the gate lines (G1 to Gn) and the data lines (D1 to Dm).

In an embodiment, each pixel PX may display one color among red, green, and blue. In another embodiment, each pixel PX may display one color among cyan, magenta and yellow. In various embodiments, each pixel PX may display one color among red, green, blue and white.

In an embodiment, the display device may be configured with an input sensing device. The input sensing device may include a sensing panel TSP and the sensing driving circuit 20.

The touch panel TSP may be disposed by overlapping the display panel DIS, and may be configured as an external type (an Add-On type) attached to an upper portion of the display panel DIS, or as an embedded type (an In-Cell type or an On-Cell type) disposed between layers of the display panel DIS.

The touch panel TSP includes touch electrodes, and includes touch lines connected to the touch electrodes. The touch electrodes may be electrically connected to a touch driving circuit 20 through the touch lines. Each of the touch electrodes may receive a common voltage signal (or referred to as a touch driving signal) from the touch driving circuit 20 through the corresponding touch line, and output a touch sensing signal to the touch driving circuit 20 in response to the received signal.

The touch driving circuit 20 may sense a change amount of the capacitance in the touch electrode so as to determine whether input of a conductive material such as a finger occurs and where the input thereof occurs. The touch driving circuit 20 may apply the common voltage signal to the touch electrode through the touch line, and may receive the input sensing signal output from the touch lines.

The touch driving circuit 20 determines that an input occurs when the change amount of the capacitance of the touch electrode is greater than a threshold value by using the touch sensing signal, and transmits sensing data including coordinate information (XY) and the like of the input to the host system 18.

The touch driving circuit 20 may be implemented independently, or may be implemented as one or more integrated circuits together with the data driving circuit 12.

In an embodiment, the display device may be a rigid display device or a flexible display device. For example, the display device may be a foldable display device, a bendable display device, a rollable display device, a stretchable display device, and the like.

Figure 2:
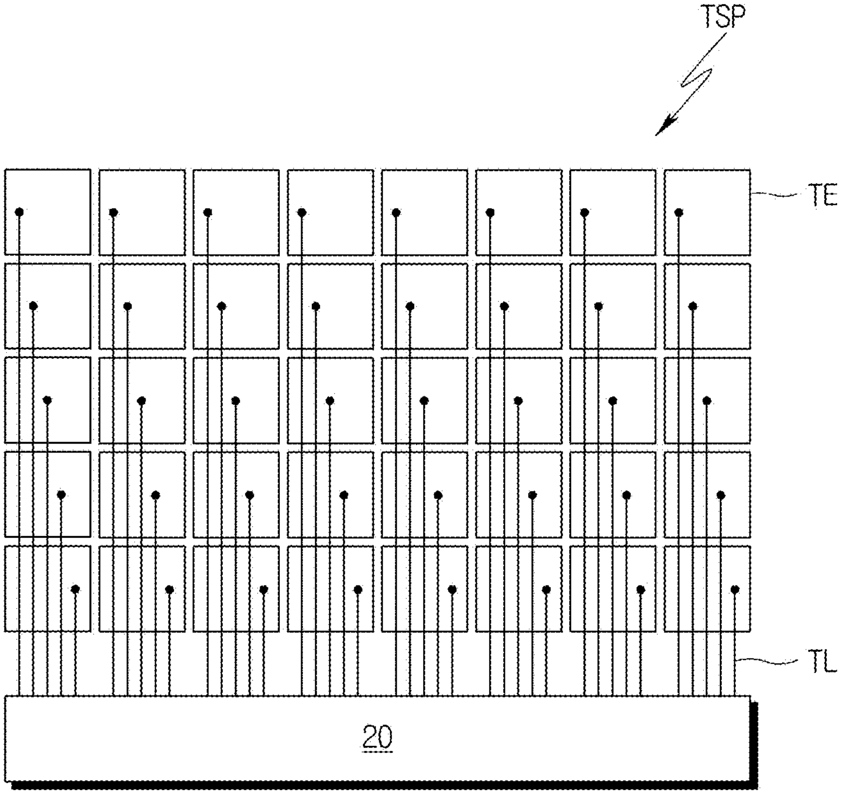
FIG. 2 is a view briefly illustrating an input sensing device according to a first embodiment.

FIG. 2 is a view briefly illustrating an input sensing device according to a first embodiment.

Referring to FIG. 2, the input sensing device may provide a touch sensing function based on a self-capacitance manner in which a touch input is sensed by measuring the capacitance formed in each touch electrode TE or a change of the capacitance. The input sensing device may include the touch panel TSP, and the touch driving circuit 20 according to the embodiment.

In the touch panel TSP, a plurality of touch electrodes TE may be disposed. Each of the touch electrodes TE may receive a common voltage signal and output a touch sensing signal. Each of the plurality of touch electrodes TE may be electrically connected to the touch driving circuit 20 through one or more touch lines TL.

A size of a region in which one touch electrode TE is formed may correspond to or may be greater than a size of a region in which a pixel is formed. For example, one touch electrode TE may be formed such that the one touch electrode TE overlaps two or more pixels. However, the disclosed technology is not limited thereto.

Meanwhile, in FIG. 2, a case in which the touch panel TSP is based on the self-capacitance manner in which the touch input is sensed by measuring the capacitance formed in each of the touch electrodes TE, or the change of the capacitance, is given as an example. However, the disclosed technology is not limited thereto. In various other embodiments, the touch panel TSP may provide a touch sensing function based on a mutual capacitance manner in which the touch input is sensed by measuring the capacitance formed between two touch electrodes (e.g., a Tx electrode and an Rx electrode) or a change in the capacitance.

The touch driving circuit 20 may be electrically connected to the touch electrodes TE through the touch line TL. The touch driving circuit 20 may supply a common voltage signal to the touch panel TSP during a touch driving period in which the touch sensing is performed. The common voltage signal may be a signal in various shapes such as a pulse in the shape of a square wave, a sine wave, a triangle wave, and the like. The touch driving circuit 20 may determine whether there is an input and/or a position of the input based on a touch sensing signal received (detected) from the touch electrodes TE in response to the common voltage signal.

The touch driving circuit 20 may divide the plurality of touch electrodes TE into a plurality of groups, and may sense each of the groups as one sensing unit. The touch driving circuit 20 may sense the touch electrodes TE included in one sensing unit during the touch sensing period, and may receive the touch sensing signal.

One sensing unit may be, for example, configured with the touch electrodes TE disposed in shapes such as one or two or more touch electrode rows, one or two or more touch electrode columns, or in a polygonal shape such as a quadrangle, a triangle, and the like. However, the disclosed technology is not limited thereto.

The touch driving circuit 20 may sense one or a plurality of sensing units during one touch sensing driving. In addition, the touch driving circuit 20 may sense the sensing units sequentially or non-sequentially. For example, the touch driving circuit 20 may sense one sensing unit at once, or two or more sensing units simultaneously.

In an embodiment, the touch driving circuit 20 may be configured to apply a predetermined voltage, for example, a common voltage to the touch electrodes TE during a display driving period in which an image is displayed through the pixel. By applying a stable direct current voltage to the touch electrodes TE, noise generation caused by the touch electrodes TE to the display panel DIS (FIG. 1) during the display driving period may be prevented.

Hereinafter, a method for driving the input sensing device through the touch driving circuit 20 will be described in more detail.

Figure 3:
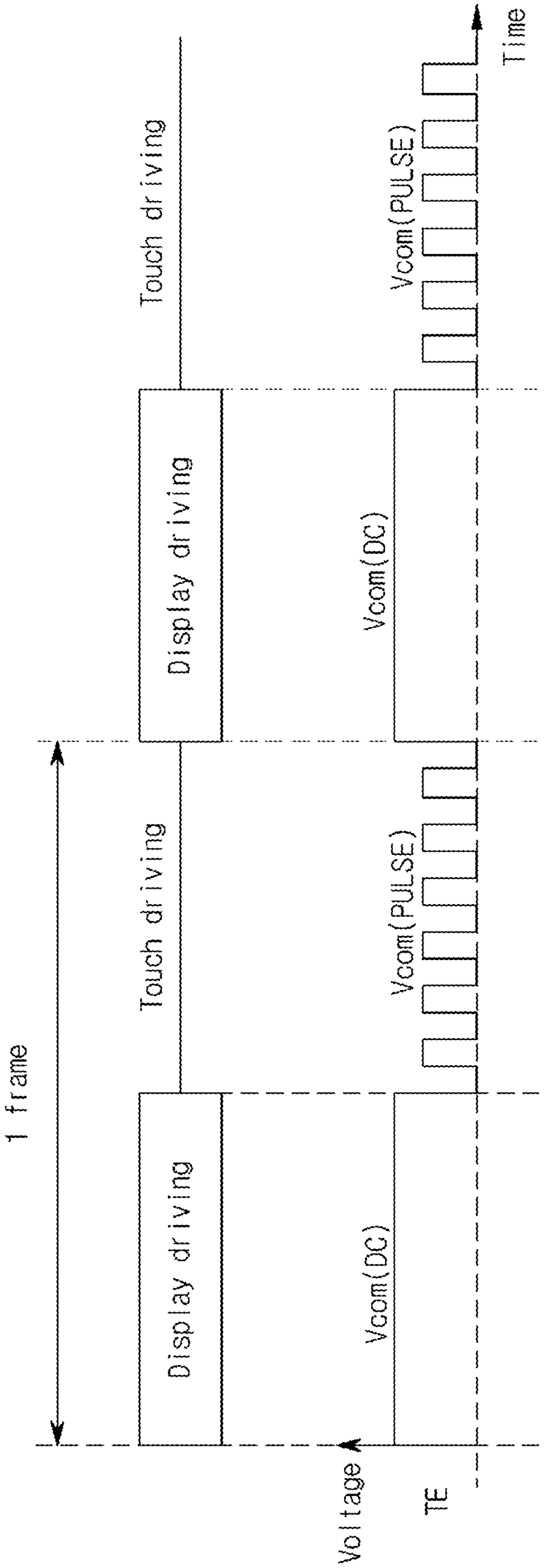
FIG. 3 is a view illustrating a driving signal of a touch panel illustrated in FIG. 2.

FIG. 3 is a view illustrating a driving signal of the touch panel illustrated in FIG. 2.

Referring to FIG. 3, one frame for driving the display device according to an embodiment may include a display driving period and a touch driving period. The display driving period and the touch driving period may be time-divided within one frame.

Referring to FIGS. 2 and 3 together, during the display driving period, the touch driving circuit 20 may apply a common voltage signal Vcom in a direct current voltage form to all the touch electrodes TE through all the touch lines LT.

During the touch driving period after the display driving period, the touch driving circuit 20 may apply a common voltage signal Vcom in a pulse form to the touch electrodes TE through the touch lines TL. The common voltage signal Vcom may be a pulse signal in the shape of a square wave as illustrated, but is not limited thereto, and may be a signal in various shapes such as a sine wave, and a triangle wave.

The touch driving circuit 20 may be connected to the touch electrode TE through the touch line TL, and may be configured to optionally apply the common voltage signal Vcom in a direct current form or a pulse form to the touch electrode TE. To this end, the touch driving circuit 20 may be configured with at least one switching circuit and/or logic element.

Figure 4:
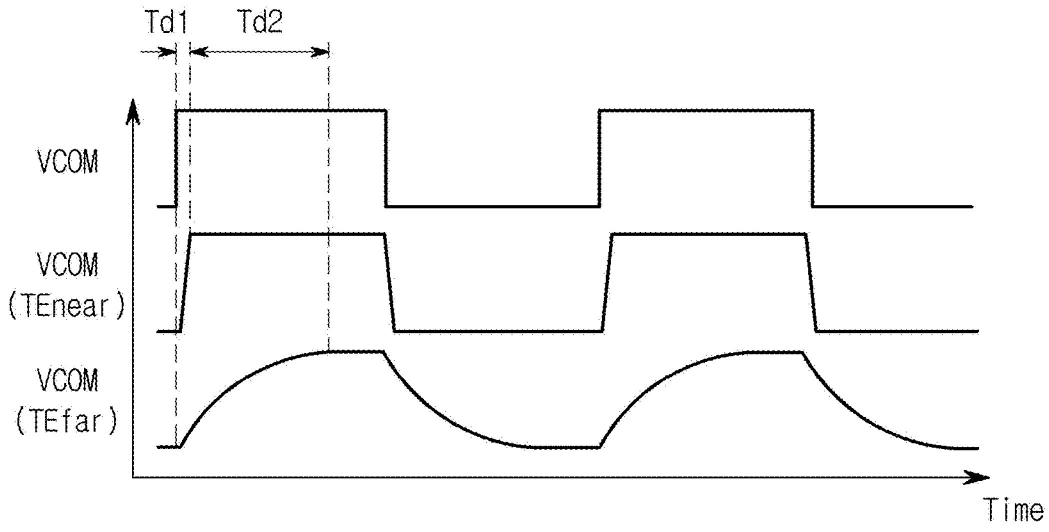
FIG. 4 is a view illustrating a waveform of a common voltage signal according to an embodiment.

FIG. 4 is a view illustrating a waveform of the common voltage signal according to an embodiment.

Referring to FIGS. 2 and 4 together, during the touch driving period, the common voltage signal Vcom in a pulse form output from the touch driving circuit 20 is a load-free driving signal, and may be applied to the touch electrodes TE through the touch lines TL. At this instance, the touch line TL acts as a resistance element (or a resistor) of the common voltage signal Vcom, and a predetermined delay time Td1 and Td2 may be generated by the time when the common voltage signal Vcom reaches a desired voltage. Such a delay time may include a rising time delay and a falling time delay.

As a length of the touch line TL gets longer, the resistance element increases, therefore, the delay time Td1 and Td2 of the common voltage signal Vcom gets longer. That is, the common voltage signal Vcom applied to the touch electrodes TEnear disposed near from the touch driving circuit 20 reaches the desired voltage after a first delay time Td1, and the common voltage signal Vcom applied to the touch electrodes TEfar disposed far from the touch driving circuit 20 reaches the desired voltage after a second delay time Td2. Here, the second delay time Td2 is longer than the first delay time Td1.

The delay phenomenon of the common voltage signal Vcom deteriorates a driving capability of the touch electrode TE. In particular, a waveform distortion of the common voltage signal Vcom according to a position in the touch panel TSP generates a difference in the capacitance between the touch sensing signals, thereby reducing the touch sensing accuracy.

Figure 5:
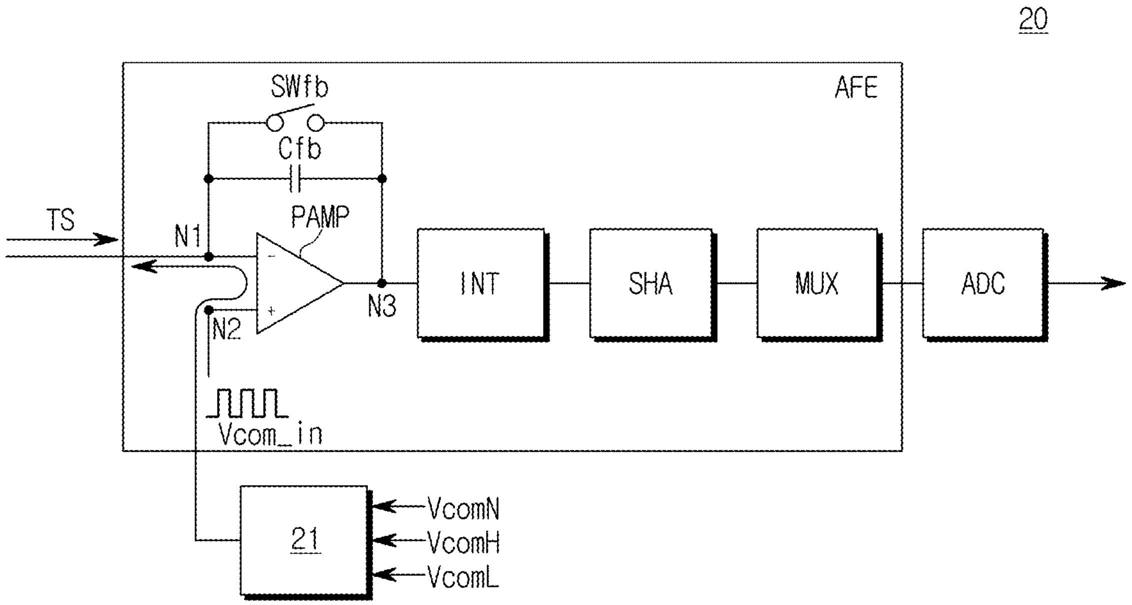
FIG. 5 is a block diagram illustrating a configuration of a touch driving circuit according to an embodiment.

FIG. 5 is a block diagram illustrating a configuration of the touch driving circuit according to an embodiment.

Referring to FIG. 5, the touch driving circuit 20 according to an embodiment may include an analog front end circuit AFE and an analog-digital converter ADC. The analog front end circuit AFE may be provided in plural number in correspondence with one or more sensing units, and the analog-digital converter ADC may be connected to one or two or more analog front end circuits AFE. That is, one analog-digital converter ADC may be shared between two or more analog front end circuits AFE.

The analog front end circuit AFE may generate and output a sampling signal by processing the touch sensing signal TS output from the touch electrode TE (FIG. 2). Each of the analog front end circuits AFE may include a preamplifier PAMP, an integration circuit INT, a sampling and hold circuit SHA, a multiplexer circuit MUX, and the like.

The preamplifier PAMP may amplify and output the touch sensing signal TS which is input. The preamplifier PAMP may include a first input terminal N1, a second input terminal N2, and an output terminal N3. A component for connecting an electrode to an input or output portion of a current is collectively called the terminal. For example, the terminal may be implemented as a pin and the like.

The touch sensing signal TS is input to the first input terminal N1 of the preamplifier PAMP. A reference signal is input to the second input terminal N2 of the preamplifier PAMP. The first input terminal N1 of the preamplifier PAMP may be an inverting input terminal (−). The second input terminal N2 of the preamplifier PAMP may be a non-inverting input terminal (+). The reference signal may be, for example, the common voltage signal Vcom.

The preamplifier PAMP may amplify a voltage difference between the first input terminal N1 and the second input terminal N2 and output the amplified voltage difference to the output terminal N3. At this instance, a characteristic (for example, a size) of a signal output to the output terminal N3 of the preamplifier PAMP may correspond to a change amount of the capacitance of the touch electrode TE (FIG. 2) caused by a touch input object (e.g., a finger, a pen, etc.).

In an embodiment, each of the analog front end circuits AFE may include a feedback capacitor Cfb electrically connected to the first input terminal N1 and the output terminal N3 of the preamplifier PAMP. The feedback capacitor Cfb includes one end electrically connected to the first input terminal N1 of the preamplifier PAMP, and the other end electrically connected to the output terminal N3 of the preamplifier PAMP. The feedback capacitor Cfb may be charged with a value corresponding to a voltage difference between the common voltage signal Vcom and the touch sensing signal TS input to the first input terminal N1 of the preamplifier PAMP.

In an embodiment, each of the analog front end circuits AFE may include a feedback switch SWfb configured to switch an electric connection between the first input terminal N1 and the output terminal N3 of the preamplifier PAMP. According to an operation of the feedback switch SWfb, charging and discharging of the feedback capacitor Cfb may be controlled.

Meanwhile, the common voltage signal Vcom input to the second input terminal N2 of the preamplifier PAMP may be applied to the touch electrode TE (FIG. 2). Therefore, the common voltage signal Vcom may be applied to one or more touch electrodes TE configuring a sensing unit.

The integration circuit INT receives a signal output from the output terminal N3 of the preamplifier PAMP. The integration circuit INT integrates a voltage or a current output from the output terminal N3 of the preamplifier PAMP a predetermined number of times and output an integration signal.

The sampling and hold circuit SHA generates a sampling signal by sampling the integration signal output from the integration circuit INT and holds the generated sampling signal.

The multiplexer circuit MUX is connected between an output terminal of the sampling and hold circuit SHA and an input terminal of the analog-digital converter ADC. The multiplexer circuit MUX may electrically connect the output terminal of the sampling and hold circuit SHA and the input terminal of the analog-digital converter ADC according to a control signal applied from an external device.

The analog-digital converter ADC may load each of the sampling signals held in the sampling and hold circuit SHA sequentially, and generate sensing data by converting the integration signal into a digital form. The analog-digital converter ADC may output the sensing data to an external device, and may transmit the data to the controller CTRL.

The touch driving circuit 20 according to an embodiment may further include the common voltage driving circuit 21. The common voltage driving circuit 21 may generate and output the common voltage signal Vcom from the voltages applied from the external device. The common voltage driving circuit 21 may generate and output the common voltage signal Vcom in a form of a direct current voltage, or the common voltage signal Vcom in a form of a pulse which swings between the first voltage and the second voltage. The common voltage signal Vcom output from the common voltage driving circuit 21 may be applied to the touch electrodes TE through the preamplifier PAMP.

A normal common voltage VcomN, a high common voltage VcomH having a higher voltage level than the normal common voltage VcomN, and a low common voltage VcomL having a lower voltage level than the normal common voltage VcomN may be received. The common voltage driving circuit 21 may apply the normal common voltage VcomN to the touch electrodes TE as a common voltage signal Vcom during the display driving period.

The common voltage driving circuit 21 may apply the common voltage signal Vcom in the form of the pulse which swings between the first voltage and the second voltage to the touch electrodes TE during the touch driving period. At this instance, the first voltage may be, for example, the high common voltage VcomH, and the second voltage may be, for example, the low common voltage VcomL.

In an embodiment, the common voltage driving circuit 21 may vary a voltage level of the common voltage signal Vcom output during the touch driving period according to a position of the touch electrode TE to which the common voltage signal Vcom is applied. For example, the common voltage driving circuit 21 may change the first voltage of the common voltage signal Vcom to the high common voltage VcomH, or to a voltage higher than the high common voltage VcomH, and the second voltage thereof to the low common voltage VcomL, or to a voltage lower than the low common voltage VcomL.

For example, when the touch electrode TE is disposed on one side surface of the touch panel TSP near the touch driving circuit 20, the common voltage driving circuit 21 may control the first voltage of the common voltage signal Vcom to be applied to the corresponding touch electrode TE as the high common voltage VcomH, and the second voltage thereof as the low common voltage VcomL. On contrary, when the touch electrode TE is disposed on the other side surface of the touch panel TSP far from the touch driving circuit 20, the common voltage driving circuit 21 may control the first voltage of the common voltage signal Vcom to be applied to the corresponding touch electrode TE as a voltage higher than the high common voltage VcomH, and the second voltage thereof as a voltage lower than the low common voltage VcomL.

A size and range of the variation of the first voltage and the second voltage may be determined based on a size and resolution of the touch panel TSP, a panel load of the touch panel TSP, and an operating speed and the like of the common voltage driving circuit 21, but are not particularly limited. A size and range of the variation of the first voltage and the second voltage may be set such that a waveform of the common voltage signal Vcom substantially applied to the touch electrodes TE is substantially the same so that the waveform distortion of the common voltage signal Vcom between the touch electrodes TE can be minimized or removed.

In an embodiment, the common voltage driving circuit 21 may be mounted to the touch driving circuit 20. However, the disclosed technology is not limited thereto. That is, in various other embodiments, the common voltage driving circuit 21 may be configured separately from the touch driving circuit 20.

Hereinafter, a detailed configuration of the common voltage driving circuit 21 for varying the first voltage and the second voltage of the common voltage signal Vcom will be described.

Figure 6:
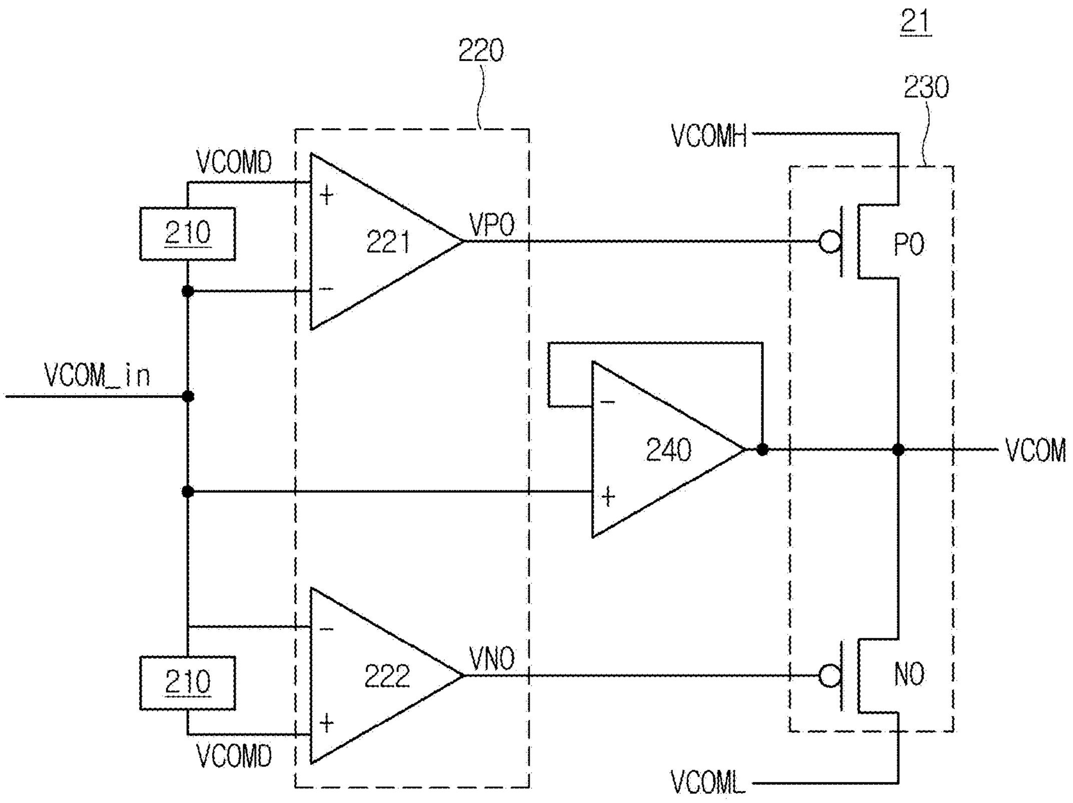
FIG. 6 is a configuration of a common voltage driving circuit according to an embodiment.

FIG. 6 is a configuration of the common voltage driving circuit according to an embodiment.

Referring to FIG. 6, the common voltage driving circuit 21 according to an embodiment may include a signal delay circuit 210, a comparator 220, a buffer 230, and an output circuit 240.

The signal delay circuit 210 may receive an input common voltage signal Vcom_in, and output a delay signal VcomD by delaying the received input common voltage signal Vcom_in by a predetermined delay time. The delay time of the delay signal VcomD may be determined based on a size and resolution of the touch panel TSP (FIG. 1), a panel load of the touch panel TSP, and an operating speed and the like of the common voltage driving circuit 21. At this instance, the delay time may be set to be shorter than a pulse width (a non-transition zone, that is, a direct current zone) of the input common voltage signal Vcom_in. For example, the delay time may be set to be about 10% or less of the pulse width of the common voltage input signal Vcom_in, but is not limited thereto.

The signal delay circuit 210 may be configured by including at least one resistor and/or at least one capacitor so that an input signal is delayed by a predetermined delay time, and then, is output. The configuration of the signal delay circuit 210 will be described in more detail below.

The comparator 220 may output a comparison signal VP0 and VN0 by comparing a delay signal VcomD output through the signal delay circuit 210 with the input common voltage signal Vcom_in. Such a comparator 220 may include a first comparator 221 and a second comparator 222.

The first comparator 221 compares the delay signal VcomD with the input common voltage signal Vcom_in, and outputs a first comparison signal VP0. The first comparator 221 may output the first comparison signal VP0 at a first level, for example, a low level, when a voltage level of the delay signal VcomD is greater than a voltage level of the input common voltage signal Vcom_in, and may output the first comparison signal VP0 at a second level, for example, a high level, when the voltage level of the delay common signal VcomD is equal to or smaller than the voltage level of the input common voltage signal Vcom_in. Such a first comparator 221 may be referred to as a P-type comparator.

The second comparator 222 compares the delay signal VcomD with the first comparison signal VP0. The second comparator 222 may output a second comparison signal VN0 at a second level, for example, a high level, when the voltage level of the delay signal VcomD is smaller than the voltage level of the input common voltage signal Vcom_in, and may output the second comparison signal VN0 at a first level, for example, a low level, when the voltage level of the delay common signal VcomD is equal to or greater than the voltage level of the input common voltage signal Vcom_in. Such a second comparator 222 may be referred to as a N-type comparator.

In an embodiment, the comparator 220 may be configured as a high-definition operational amplifier, or as a dynamic comparator having a fast response speed. When the comparator 220 is configured as an amplifier, by adjusting a size of the transistor (for example, a length of a channel, a width of the channel, etc.), the P-type or the N-type comparator can be implemented. The structure of the comparator 220 will be described in more detail below.

The buffer 230 may output the high common voltage VcomH or the low common voltage VcomL to the output terminal in response to the comparison signal VP0 and VN0 output from the comparator 220. For example, the buffer 230 may include a first buffer transistor P0 and a second buffer transistor N0.

The first buffer transistor P0 may electrically connect or disconnect a power line to which the high common voltage VcomH is applied to/from the output terminal in response to the first comparison signal VP0. The first buffer transistor P0 may output the high common voltage VcomH to the output terminal in response to the first comparison signal VP0 being at the first level, for example, the low level, and may stop the high common voltage VcomH from being output to the output terminal in response to the first comparison signal VP0 being at the second level, for example, the high level.

In an embodiment, the first buffer transistor P0 may be a PMOS transistor. The PMOS transistor may be configured to allow one electrode to receive a high common voltage VcomH, and the other electrode to be connected to an output terminal. A gate electrode of the PMOS transistor may be connected to an output terminal of the first comparator 221 so that the gate electrode thereof can receive the first comparison signal VP0. The PMOS transistor may be turned on in response to the first comparison signal VP0 being at the first level, for example, the low level, and may be turned off in response to the first comparison signal VP0 being at the second level, for example, the high level. When the PMOS transistor is turned on, the high common voltage VcomH may be output to the output terminal.

The second buffer transistor N0 may electrically connect or disconnect a power line to which the low common voltage VcomL is applied to/from the output terminal in response to the second comparison signal VP0. The second buffer transistor N0 may output the low common voltage VcomL to the output terminal in response to the second comparison signal VN0 being at the second level, for example, the high level, and may stop the low common voltage VcomL from being output to the output terminal in response to the second comparison signal VN0 being at the first level, for example, the low level.

In an embodiment, the second buffer transistor N0 may be an NMOS transistor. The NMOS transistor may be configured to allow one electrode to be connected to an output terminal, and the other electrode to be connected to the low common voltage VcomL. A gate electrode of the NMOS transistor may be connected to an output terminal of the second comparator 222 so that the gate electrode thereof can receive the second comparison signal VN0. The NMOS transistor may be turned on in response to the second comparison signal VN0 being at the second level, for example, the high level, and may be turned off in response to the second comparison signal VN0 being at the first level, for example, the low level. When the NMOS transistor is turned on, the low common voltage VcomL may be output to the output terminal.

The output circuit 240 may amplify a signal output from the buffer 230, for example, the high common voltage VcomH or the low common voltage VcomL by a predetermined ratio, and may output the amplified signal to the output terminal. In more detail, the output circuit 240 may amplify a voltage difference between a voltage output to the output terminal through the buffer 230 and the input common voltage signal Vcom_in by a predetermined amplifying ratio and may output the amplified voltage difference to the output terminal. Such an output circuit 240 may be an operational amplifier having a predetermined amplifying ratio (for example, 1) and a function of a unit gain buffer.

The operational amplifier may include an inverting input terminal (−), and a non-inverting input terminal (+). The inverting input terminal (−) is connected to the output terminal, and the non-inverting input terminal (+) is configured to receive the input common voltage signal Vcom_in. The operational amplifier may amplify the difference voltage between the voltage output to the output terminal and the input common voltage signal Vcom_in by a predetermined amplifying ratio and may output the amplified difference voltage.

When the high common voltage VcomH is applied to the output terminal through the first buffer transistor P0, a sum voltage of the input common voltage signal Vcom_in and the high common voltage VcomH is applied to the output terminal. The operational amplifier amplifies a difference voltage between the sum voltage and the input common voltage signal Vcom_in and outputs the amplified difference voltage. At this instance, the common voltage signal Vcom output to the output terminal has the first voltage greater than the high common voltage VcomH.

When the low common voltage VcomL is applied to the output terminal through the second buffer transistor N0, a sum voltage of the input common voltage signal Vcom_in and the low common voltage VcomL is applied to the output terminal. The operational amplifier amplifies a difference voltage between the sum voltage and the input common voltage signal Vcom_in and outputs the amplified difference voltage. At this instance, the common voltage signal Vcom output to the output terminal has the second voltage smaller than the low common voltage VcomL.

When the first buffer transistor P0 and the second buffer transistor N0 are both turned off, the operational amplifier may output the input common voltage signal Vcom_in to the output terminal.

When the input common voltage signal Vcom_in is a predetermined direct current voltage (for example, a normal common voltage VcomN), the common voltage signal Vcom output to the output terminal may have a form of a direct voltage having the same voltage level as the input common voltage signal Vcom_in. When the input common voltage signal Vcom_in has a form of a pulse which swings between the high common voltage VcomH and the low common voltage VcomL, the common voltage signal Vcom output to the output terminal has the first voltage greater than the high common voltage VcomH or the second voltage smaller than the low common voltage VcomL during the delay time of the signal delay circuit 210, and may have a form of the pulse which swings between the first voltage and the second voltage.

Figure 7:
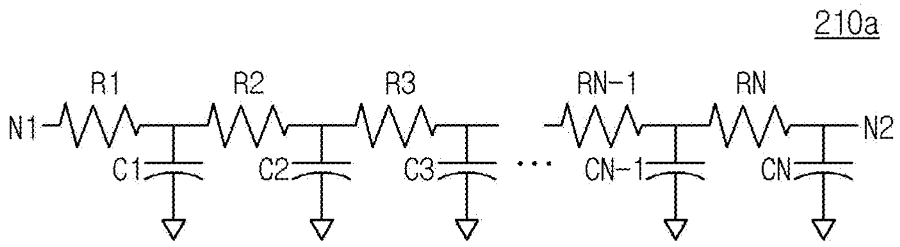
FIGS. 7 to 9 are diagrams illustrating a configuration of a signal delay circuit in FIG. 6.
Figure 8:
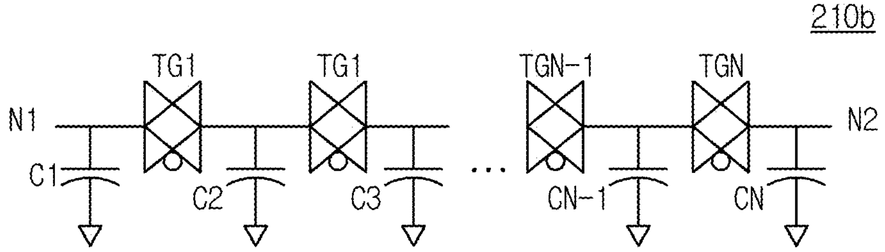
Figure 9:
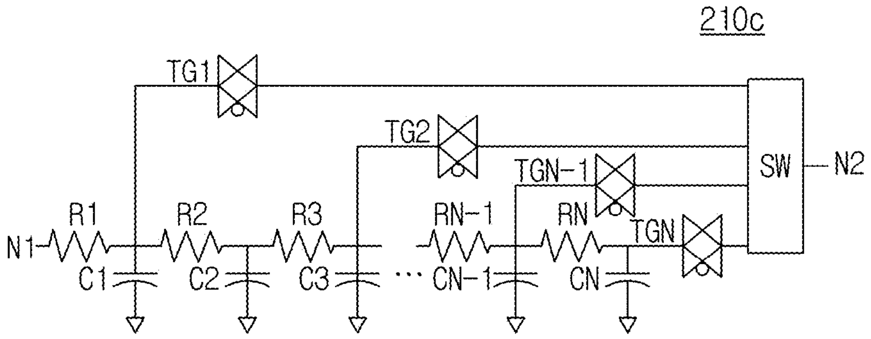

FIGS. 7 to 9 are diagrams illustrating a configuration of the signal delay circuit in FIG. 6.

Referring to FIG. 7, a signal delay circuit 210*a* according to an embodiment may include at least one resistor R1 to RN connected between an input terminal N1 and an output terminal N2 and at least one capacitor C1 to CN.

At least two resistors (R1 to RN) may be connected in series to a transmission line between the input terminal N1 and the output terminal N2. At least two capacitors C1 to CN may be connected in parallel to a transmission line between the input terminal N1 and the output terminal N2. The signal delay circuit 210*a* may operate as an RC delay circuit having a predetermined RC delay by the at least one resistor (R1 to RN) and the at least one capacitor C1 to CN.

Referring to FIG. 8, a signal delay circuit 210*b* according to another embodiment may include at least one transmission gate TG1 to TGN instead of the at least one resistor R1 to RN. The transmission gate TG1 to TGN may open or close an output of a signal which is input to the input terminal N1 to adjust a size of a voltage which is output to the output terminal N2.

Referring to FIG. 9, a signal delay circuit 210*c* according to still another embodiment may include an input terminal N1 and an output terminal N2. A plurality of resistors R1 to RM and a plurality of capacitors C1 to CM are connected to the input terminal N1.

The plurality of resistors R1 to RM may be connected in series to the input terminal N1. The plurality of capacitors C1 to CM may be connected in parallel between the plurality of resistors R1 to RM.

A transmission gate TG1 to TGN may be connected to a common node to which one capacitor C1 to CM and two adjacent resistors R1 to RM are connected. The transmission gates TG1 to TGN may be connected with an interval of one or a plurality of common nodes.

A plurality of output terminals N21 to N2*n* may be connected to a resistor-capacitor pair through corresponding transmission gates TG1 to TGn, respectively. According to a quantity of the resistor-capacitor pairs connected between the input terminal IN and the plurality of output terminals N21 to N2*n*, the output signal output to each of the plurality of output terminals N21 to N2*n* may have a different RC delay.

One among signals output from the transmission gates TG1 to TGN may be output to the output terminal N2 through a switching circuit SW or a multiplexer. The output terminal N2 may be connected to the transmission gate TG1 to TGn and the resistor-capacitor pair through the switching circuit SW. According to a quantity of the resistor-capacitor pairs connected between the input terminal IN and the output terminal N2, the output signal output to the output terminal N2 may have a different RC delay.

The input common voltage signal Vcom_in may be input to the input terminal N1 of the signal delay circuit 211, 212 and 213. The delay signal VcomD having a waveform delayed by a delay time set by the signal delay circuit 211, 212 and 213 may be output to the output terminal N2.

Figure 10:
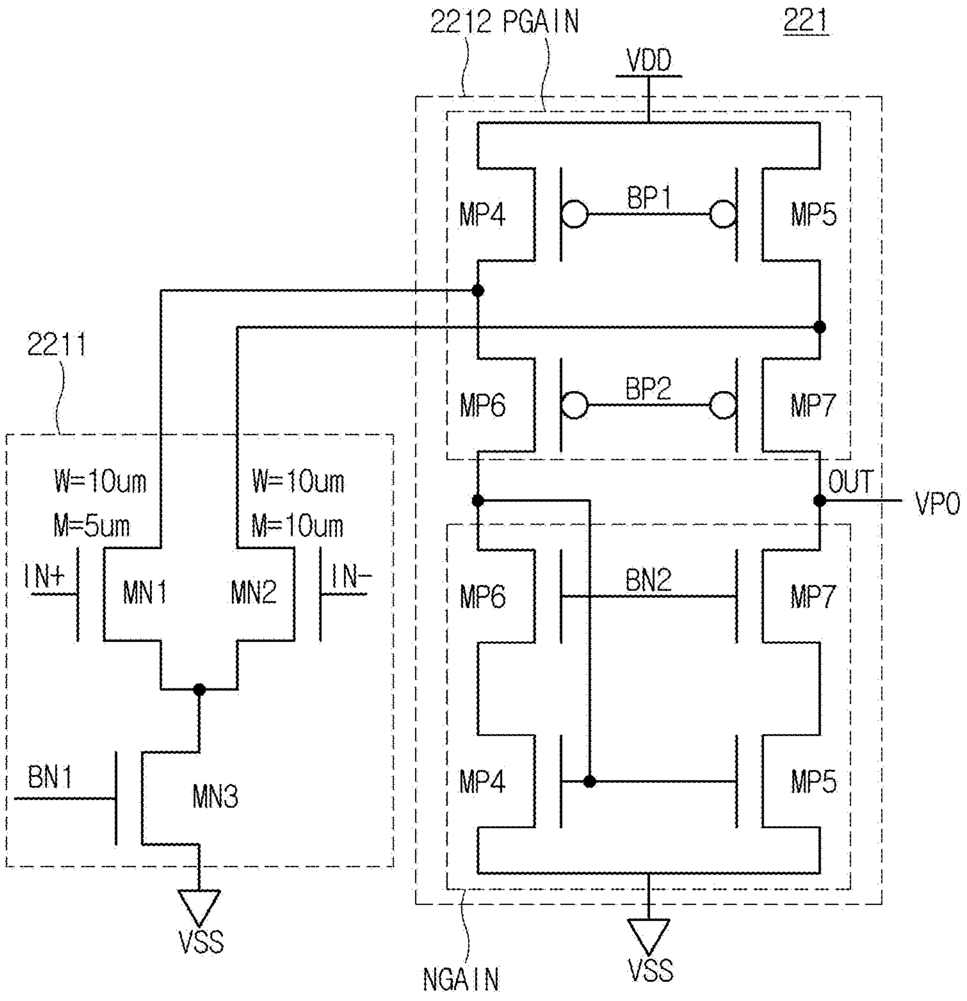
FIG. 10 is a diagram illustrating an embodiment of a first comparator in FIG. 6.

FIG. 10 is a diagram illustrating an embodiment of a first comparator in FIG. 6. Referring to FIG. 10, the first comparator 221 according to an embodiment may be configured as an amplifier.

The amplifier may include an input circuit 2211 and an amplifier 2212.

The input circuit 2211 is connected to an output terminal of the signal delay circuit 210. The input circuit 2211 may include a first N-type transistor MN1 and a second N-type transistor MN2, to which a first input signal IN+ and a second input signal IN− are applied to a gate node, respectively. At this instance, the first input signal IN+ may be a delay signal VcomD which is an output signal of the signal delay circuit 210, and the second input signal IN− may be an input common voltage signal Vcom_in. The first and the second N-type transistors MN1 and MN2 may be connected in parallel.

In addition, the input circuit 2211 may include a third N-type transistor MN3 which is turned on/off by a first N-type driving control signal BN1 applied to the gate node, and connected between a common node of source electrodes of the first and the second N-type transistors MN1 and MN2 and a node for a low potential voltage VSS. The third N-type transistor MN3 may operate as a constant current source which applies a constant reference current to the input circuit 2211 by the first N-type driving control signal BN1. The first N-type driving control signal BN1 may be a turned-on level voltage.

The amplifier 2212 may include a first amplifier PGAIN which includes a plurality of P-type transistors MP4, MP5, MP6 and MP7, and a second amplifier NGAIN which includes a plurality of N-type transistors MN4, MN5, MN6 and MN7. Each of the first amplifier PGAIN and the second amplifier NGAIN may be implemented to have a cascode configuration.

The first amplifier PGAIN may include a pair of P-type transistors MP4 and MP5 connected between a high potential voltage VDD and a first differential input end and configuring a first current mirror. In addition, the first amplifier PGAIN may further include a pair of P-type transistors MP6 and MP7 connected in series to each of the P-type transistors MP4 and MP5 of the first current mirror, and configuring a second current mirror.

The pair of P-type transistors MP4 and MP5 configuring the first current mirror may be operated by a first P-type driving control signal BP1, and the pair of P-type transistors MP6 and MP7 configuring the second current mirror may be operated by a second P-type driving control signal BP2.

The first current mirror and the second current mirror adjust an output current according to a difference voltage of the first differential input end. In more detail, in preparation for a current flowing in the input circuit 2211, a current flowing in the second current mirror may be amplified by a predetermined ratio. At this instance, the predetermined ratio may correspond to a size ratio (for example, a length of the channel, a width of the channel, etc.) of the transistor.

The second amplifier NGAIN may include a pair of N-type transistors MN4 and MN5 connected between a node for the low potential voltage VSS and a second differential input end and configuring a third current mirror. In addition, the second amplifier NGAIN may further include a pair of N-type transistors MN6 and MN7 connected in series to each of the N-type transistors MN4 and MN5 of the third current mirror and configuring a fourth current mirror.

The pair of N-type transistors MN4 and MN5 configuring the third current mirror may be operated by a predetermined feedback signal output between the first current mirror and the fourth current mirror, and the pair of N-type transistors MN6 and MN7 configuring the fourth current mirror may be operated by a second N-type driving control signal BN2.

The third current mirror and the fourth current mirror adjust the output current according to a difference voltage of the second differential input end. In more detail, in preparation for a current flowing in the input circuit 2211, a current flowing in the fourth current mirror may be amplified by a predetermined ratio. At this instance, the predetermined ratio may correspond to a size ratio of the transistor.

The driving control signal BP1, BP2 and BN2 used by the amplifier 2212 may be a turned-on level voltage.

The current amplified through the amplifier 2212 may be output through the output terminal OUT. Here, the signal output to the output terminal OUT may be the first comparison signal VP0.

A magnitude of the current output from the amplifier 2212 may be determined by a magnitude of a reference current applied to the input circuit 2211 and the amplifier 2212 through the constant current source, and a size of transistors provided in the input circuit 2211 and the amplifier 2212. For example, it is assumed that a reference current I is applied to the input circuit 2211 by the third N-type transistor MN3 of the input circuit 2211, and a size of a channel of the P-type transistors MP4, MP5, MP6 and MP7 of the first control circuit PGAIN is K times (K is a natural number equal to or more than 2) a size of a channel of the N-type transistors MN1 and MN2 of the input circuit 2211. Then, the current flowing through the output terminal OUT may be K times the reference current I. In such an embodiment, by adjusting the magnitude of the reference current I and/or the size of the transistors of the amplifier 2212, it is possible to adjust a size of the output signal (output current) output to the output terminal OUT.

The amplifier configured as described above may amplify a difference voltage between the first input signal IN+ and the second input signal IN− and output the amplified difference voltage. When the first input signal IN+ has a voltage level smaller than the second input signal IN−, the difference voltage may have a negative voltage level, and the output signal may have a negative voltage level (for example, a low level). When the first input signal IN+ is greater than the second input signal IN−, the difference voltage may have a positive voltage level, and the output signal may have a positive voltage level (for example, a high level).

When the voltage level of the input signals IN+ and IN− is the same, a polarity of the current output from the amplifier 2212 may be determined by a size difference of the first N-type transistor MN1 and the second N-type transistor MN2 configuring the input circuit 2211. For example, when a width and/or a length of the channel of the first N-type transistor MN1 receiving the first input signal IN+ is smaller than a width and/or a length of the channel of the second N-type transistor MN2, a polarity of the current output from the amplifier 2212 may be positive (for example, the high level) in a state in which the voltage level of the input signals IN+ and IN− is the same.

In an embodiment, a width of the channel of the first N-type transistor MN1 may be 10 microns (um) and a length of the channel thereof may be 5 um. A width of the channel of the second N-type transistor MN2 may be 10 um and a length of the channel thereof may be 10 um. However, the sizes of the first N-type transistor MN1 and the second N-type transistor MN2 are not limited thereto.

When the voltage level of the input signals IN+ and IN− is the same, the P-type comparator of which the output signal is at the low level (the turned-on level) may be implemented only when the first input signal IN+ has a voltage level smaller than that of the second input signal IN−, by controlling the polarity of the current output from the amplifier 2212 to be positive.

Figure 11:
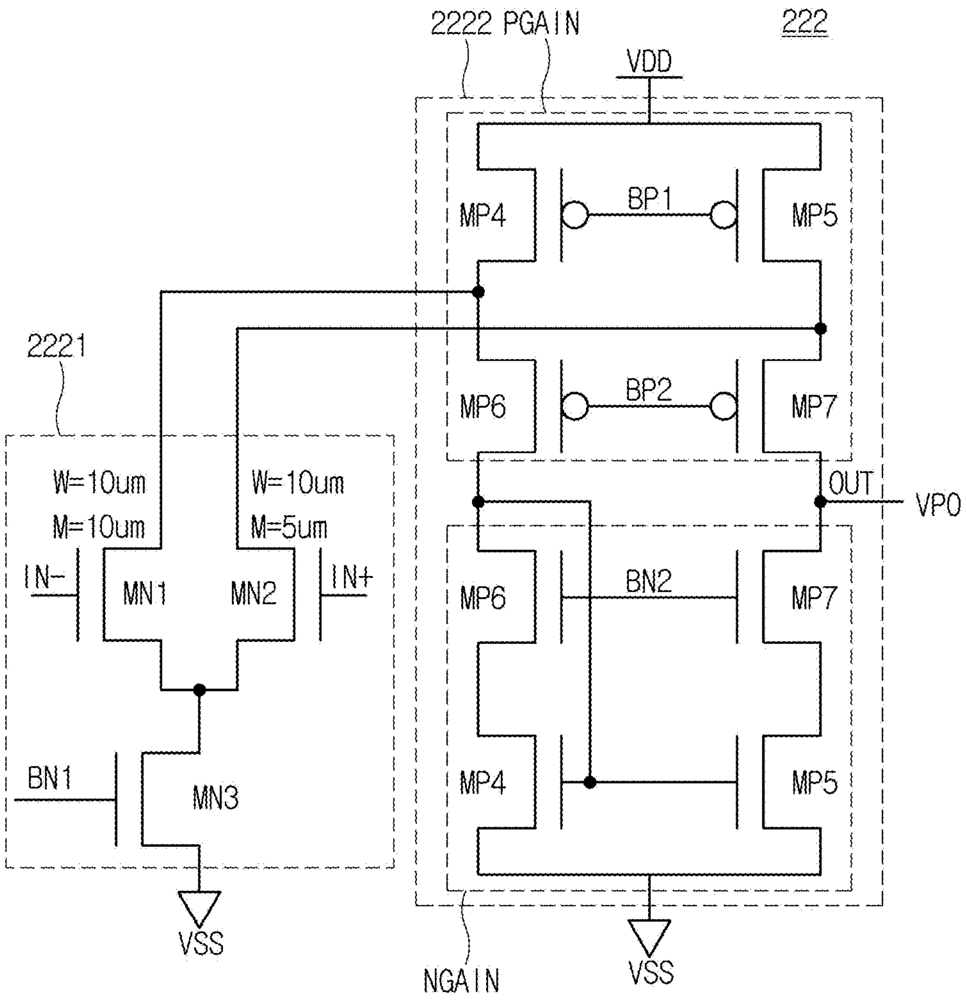
FIG. 11 is a diagram illustrating an embodiment of a second comparator in FIG. 6.

FIG. 11 is a diagram illustrating an embodiment of the second comparator in FIG. 6. Referring to FIG. 11, the second comparator 222 according to an embodiment may be configured as an amplifier.

The amplifier may include an input circuit 2221 and an amplifier 2222.

The input circuit 2221 is connected to an output terminal of the signal delay circuit 210. The input circuit 2221 may include a first N-type transistor MN1 and a second N-type transistor MN2, to which a first input signal IN− and a second input signal IN+ is applied to a gate node, respectively. At this instance, the first input signal IN− may be an input common voltage signal Vcom_in which is an output signal of the signal delay circuit 210, and the second input signal IN+ may be a delay signal VcomD. The first and the second N-type transistors MN1 and MN2 may be connected in parallel.

In addition, the input circuit 2221 may include a third N-type transistor MN3 which is turned on/off by a first N-type driving control signal BN1 applied to the gate node, and connected between a common node of source electrodes of the first and the second N-type transistors MN1 and MN2 and the high potential voltage VDD. The third N-type transistor MN3 may operate as a constant current source which applies a constant reference current to the input circuit 2221 by the first N-type driving control signal BN1. The first N-type driving control signal BN1 may be a turned-on level voltage.

The amplifier 2222 may include a first amplifier PGAIN which includes a plurality of P-type transistors MP4, MP5, MP6 and MP7, and a second amplifier NGAIN which includes a plurality of N-type transistors MN4, MN5, MN6 and MN7. Each of the first amplifier PGAIN and the second amplifier NGAIN may be implemented to have a cascode configuration.

The first amplifier PGAIN may include a pair of P-type transistors MP4 and MP5 connected between the high potential voltage VDD and a first differential input end and configuring a first current mirror. In addition, the first amplifier PGAIN may further include a pair of P-type transistors MP6 and MP7 connected in series to each of the P-type transistors MP4 and MP5 of the first current mirror, and configuring a second current mirror.

The pair of P-type transistors MP4 and MP5 configuring the first current mirror may be operated by a first P-type driving control signal BP1, and the pair of P-type transistors MP6 and MP7 configuring the second current mirror may be operated by a second P-type driving control signal BP2.

The first current mirror and the second current mirror adjust an output current according to a difference voltage of the first differential input end. In more detail, in preparation for a current flowing in the input circuit 2221, a current flowing in the second current mirror may be amplified by a predetermined ratio. At this instance, the predetermined ratio may correspond to a size ratio (for example, a length of the channel, a width of the channel, etc.) of the transistor.

The second amplifier NGAIN may include a pair of N-type transistors MN4 and MN5 connected between a node for the low potential voltage VSS and a second differential input end and configuring a third current mirror. In addition, the second amplifier NGAIN may further include a pair of N-type transistors MN6 and MN7 connected in series to each of the N-type transistors MN4 and MN5 of the third current mirror and configuring a fourth current mirror.

The pair of N-type transistors MN4 and MN5 configuring the third current mirror may be operated by a predetermined feedback signal output between the first current mirror and the fourth current mirror, and the pair of N-type transistors MN6 and MN7 configuring the fourth current mirror may be operated by a second N-type driving control signal BN2.

The third current mirror and the fourth current mirror adjust the output current according to a difference voltage of the second differential input end. In more detail, in preparation for a current flowing in the input circuit 2221, a current flowing in the fourth current mirror may be amplified by a predetermined ratio. At this instance, the predetermined ratio may correspond to a size ratio of the transistor.

The driving control signal BP1, BP2 and BN2 used by the amplifier 2222 may be a turned-on level voltage.

The current amplified through the amplifier 2222 may be output through the output terminal OUT. Here, the signal output to the output terminal OUT may be the second comparison signal VN0.

A magnitude of the current output from the amplifier 2222 may be determined by a magnitude of a reference current applied to the input circuit 2221 and the amplifier 2222 through the constant current source, and a size of transistors provided in the input circuit 2221 and the amplifier 2222. For example, it is assumed that a reference current I is applied to the input circuit 2221 by the third N-type transistor MN3 of the input circuit 2221, and a size of a channel of the P-type transistors MP4, MP5, MP6 and MP7 of the first control circuit PGAIN is K times (K is a natural number equal to or more than 2) a size of a channel of the N-type transistors MN1 and MN2 of the input circuit 2221. Then, the current flowing through the output terminal OUT may be K times the reference current I. In such an embodiment, by adjusting the magnitude of the reference current I and/or the size of the transistors of the amplifier 2222, it is possible to adjust a size of the output signal (output current) output to the output terminal OUT.

The amplifier configured as described above may amplify a difference voltage between the first input signal IN+ and the second input signal IN− and output the amplified difference voltage. When the first input signal IN− has a voltage level smaller than the second input signal IN+, the difference voltage may have a negative voltage level, and the output signal may have a negative voltage level (for example, a low level). When the first input signal IN− is greater than the second input signal IN+, the difference voltage may have a positive voltage level, and the output signal may have a positive voltage level (for example, a high level).

When the voltage level of the input signals IN+ and IN− is the same, a polarity of the current output from the amplifier 2222 may be determined by a size difference of the first N-type transistor MN1 and the second N-type transistor MN2 configuring the input circuit 2221. For example, when a width and/or a length of the channel of the first N-type transistor MN1 receiving the first input signal IN− is greater than a width and/or a length of the channel of the second N-type transistor MN2, a polarity of the current output from the amplifier 2222 may be negative (for example, the low level) in a state in which the voltage level of the input signals IN+ and IN− is the same.

In an embodiment, a width of the channel of the first N-type transistor MN1 may be 10 um and a length of the channel thereof may be 10 um. A width of the channel of the second N-type transistor MN2 may be 10 um and a length of the channel thereof may be 5 um. However, the sizes of the first N-type transistor MN1 and the second N-type transistor MN2 are not limited thereto.

When the voltage level of the input signals IN+ and IN− is the same, the N-type comparator, of which the output signal is at the high level (the turned-on level), may be implemented only when the first input signal IN+ has a voltage level greater than that of the second input signal IN−, by controlling the polarity of the current output from the amplifier 2222 to be positive.

Figure 12:
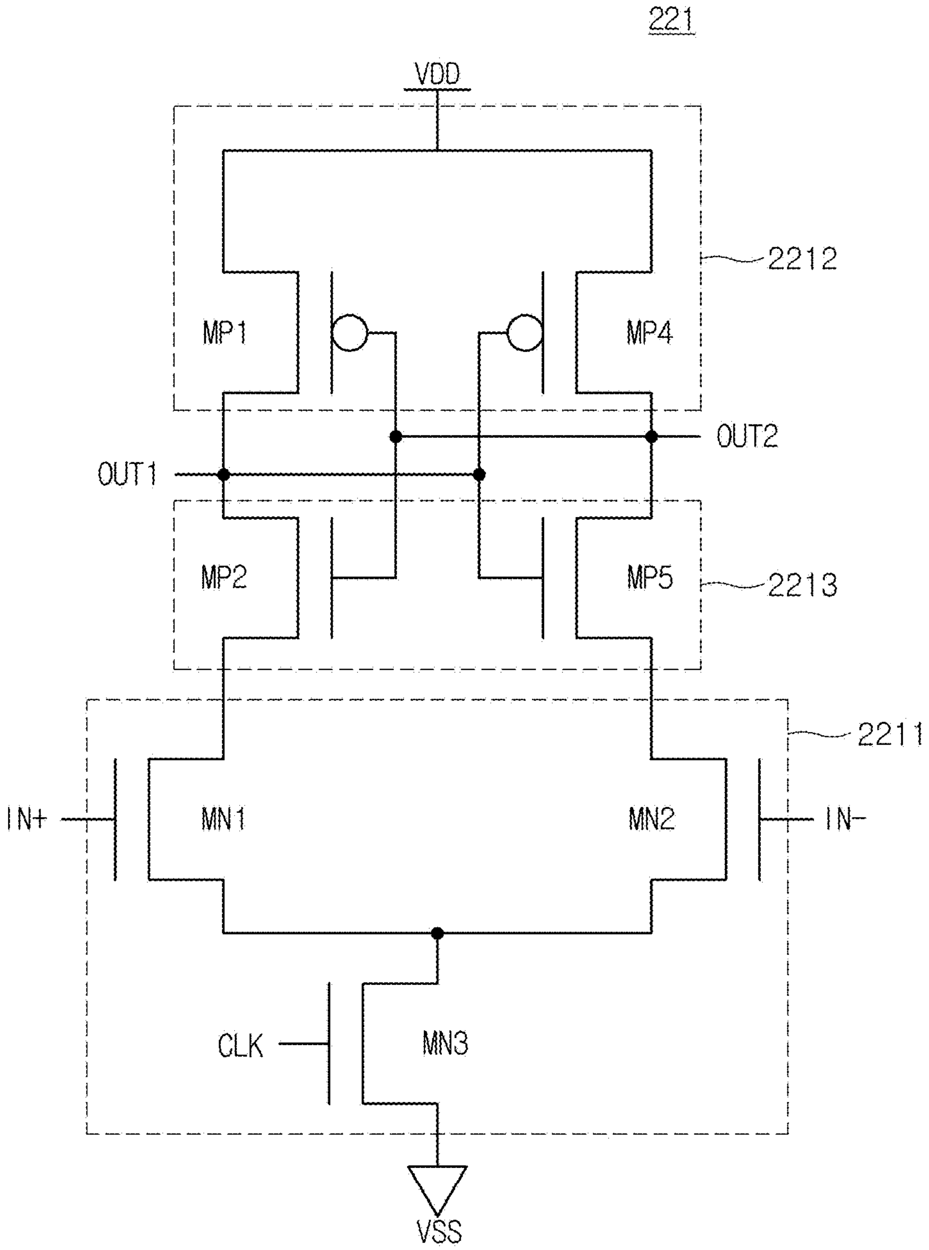
FIG. 12 is a diagram illustrating another embodiment of a first comparator in FIG. 6.

FIG. 12 is a diagram illustrating another embodiment of a first comparator in FIG. 6. Referring to FIG. 12, a first comparator 221 according to another embodiment may be configured as a dynamic comparison circuit.

The dynamic comparison circuit is a latch circuit, and may include an input circuit 2211, a first inverter 2212 and a second inverter 2213.

The input circuit 2211 is connected to an output terminal of the signal delay circuit 210. The input circuit 2211 may include a first N-type transistor MN1 and a second N-type transistor MN2, to which a first input signal IN+ and a second input signal IN− are applied to a gate node, respectively. At this instance, the first input signal IN+ may be a delay signal VcomD which is an output signal of the signal delay circuit 210, and the second input signal IN− may be an input common voltage signal Vcom_in. The first and the second N-type transistors MN1 and MN2 may be connected in parallel.

In addition, the input circuit 2211 may include a third N-type transistor MN3 which is turned on/off by a clock signal CLK applied to a gate node, and connected between a common node of source electrodes of the first and the second N-type transistors MN1 and MN2 and a node for the low potential voltage VSS. The third N-type transistor MN3 may operate as a constant current source which applies a constant reference current to the input circuit 2211 by the clock signal CLK.

The first inverter 2212 includes two transistors MN4 and MP1. The two transistors MN4 and MP1 may be connected in series between a drain electrode of the first N-type transistor MN1 and the high potential voltage VDD. A gate electrode of the two transistors MN4 and MP1 may be commonly connected to a second output terminal OUT2.

The second inverter 2213 includes two transistors MN5 and MP2. The two transistors MN5 and MP2 may be connected in series between a drain electrode of the second N-type transistor MN2 and the high potential voltage VDD. A gate electrode of the two transistors MN5 and MP2 may be commonly connected to a first output terminal OUT1.

Such a dynamic comparison circuit is reset when the clock signal CLK is at a low level, and pulls up a current output to the output terminal OUT1 and OUT2. When the clock signal CLK is transitioned from a low level to a high level, the third N-type transistor MN3 is turned on. When the third N-type transistor MN3 is turned on, a current corresponding to a size of the first input signal IN+ and the second input signal IN− may be applied to the inverters 2212 and 2213, through the first N-type transistor MN1 and the second N-type transistor MN2.

A magnitude of the current output to the output terminals OUT1 and OUT2 from the inverters 2212 and 2213 is reduced in correspondence with a magnitude of the current applied through the first N-type transistor MN1 and the second N-type transistor MN2. When the second input signal IN− is greater than the first input signal IN+, an output current in the first output terminal OUT1 may be reduced faster, and on contrary, when the first input signal IN+ is greater than the second input signal IN−, an output current in the second output terminal OUT2 may be reduced faster.

A difference between the first output terminal OUT1 and the second output terminal OUT2 may be output as the first comparison signal VP0. When the output current in the first output terminal OUT1 is reduced more, the first comparison signal VP0 may be in a negative voltage level (for example, the low level). When the output current in the second output terminal OUT2 is reduced more, the first comparison signal VP0 may be the second comparison signal VN0 in a positive voltage level (for example, the high level).

Figure 13:
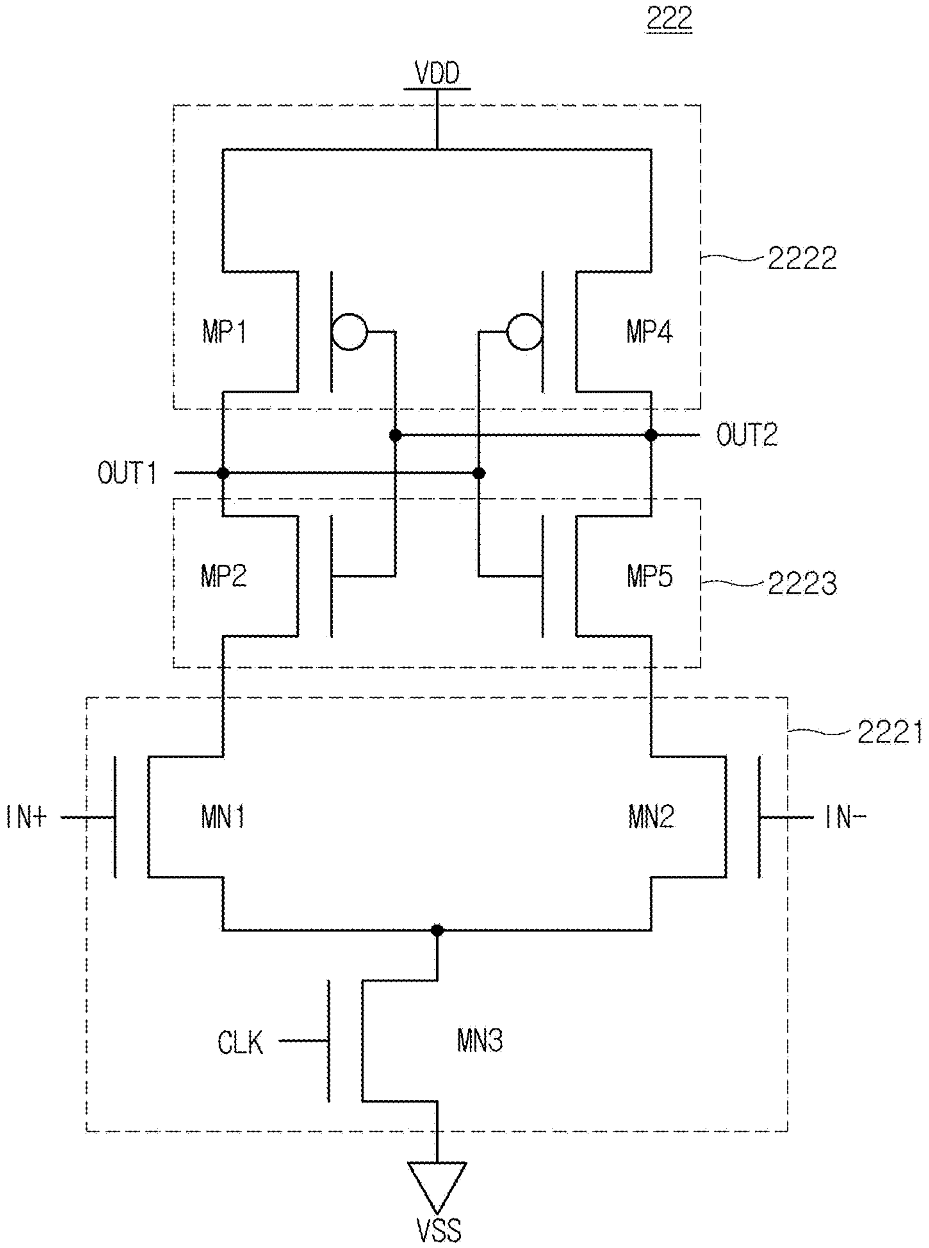
FIG. 13 is a diagram illustrating another embodiment of a second comparator in FIG. 6.

FIG. 13 is a diagram illustrating another embodiment of a second comparator in FIG. 6. Referring to FIG. 13, a first comparator 222 according to another embodiment may be configured as a dynamic comparison circuit.

The dynamic comparison circuit is a latch circuit, and may include an input circuit 2221, a first inverter 2222 and a second inverter 2223.

The input circuit 2221 is connected to an output terminal of the signal delay circuit 210. The input circuit 2221 may include a first N-type transistor MN1 and a second N-type transistor MN2, to which a first input signal IN+ and a second input signal IN− are applied to a gate node, respectively. At this instance, the first input signal IN+ may be a delay signal VcomD which is an output signal of the signal delay circuit 210, and the second input signal IN− may be an input common voltage signal Vcom_in. The first and the second N-type transistors MN1 and MN2 may be connected in parallel.

In addition, the input circuit 2221 may include a third N-type transistor MN3 which is turned on/off by a clock signal CLK applied to a gate node, and connected between a common node of source electrodes of the first and the second N-type transistors MN1 and MN2 and a node for the low potential voltage VSS. The third N-type transistor MN3 may operate as a constant current source which applies a constant reference current to the input circuit 2211 by the clock signal CLK.

The first inverter 2222 includes two transistors MN4 and MP1. The two transistors MN4 and MP1 may be connected in series between a drain electrode of the first N-type transistor MN1 and the high potential voltage VDD. A gate electrode of the two transistors MN4 and MP1 may be commonly connected to a second output terminal OUT2.

The second inverter 2223 includes two transistors MN5 and MP2. The two transistors MN5 and MP2 may be connected in series between a drain electrode of the second N-type transistor MN2 and the high potential voltage VDD. A gate electrode of the two transistors MN5 and MP2 may be commonly connected to a first output terminal OUT1.

Such a dynamic comparison circuit is reset when the clock signal CLK is at a low level, and pulls up a current output to the output terminal OUT1 and OUT2. When the clock signal CLK is transitioned from a low level to a high level, the third N-type transistor MN3 is turned on. When the third N-type transistor MN3 is turned on, a current corresponding to a size of the first input signal IN+ and the second input signal IN− may be applied to the inverters 2222 and 2223, through the first N-type transistor MN1 and the second N-type transistor MN2.

A magnitude of the current output to the output terminals OUT1 and OUT2 from the inverters 2222 and 2223 is reduced in correspondence with a magnitude of the current applied through the first N-type transistor MN1 and the second N-type transistor MN2. When the second input signal IN− is greater than the first input signal IN+, an output current in the first output terminal OUT1 may be reduced faster, and on contrary, when the first input signal IN+ is greater than the second input signal IN−, an output current in the second output terminal OUT2 may be reduced faster.

A difference between the first output terminal OUT1 and the second output terminal OUT2 may be output as the second comparison signal VN0. When the output current in the second output terminal OUT2 is reduced more, the second comparison signal VN0 may be in a negative voltage level (for example, the low level). When the output current in the second output terminal OUT2 is reduced more, the second comparison signal VN0 may be the second comparison signal VN0 in a positive voltage level (for example, the high level).

Figure 14:
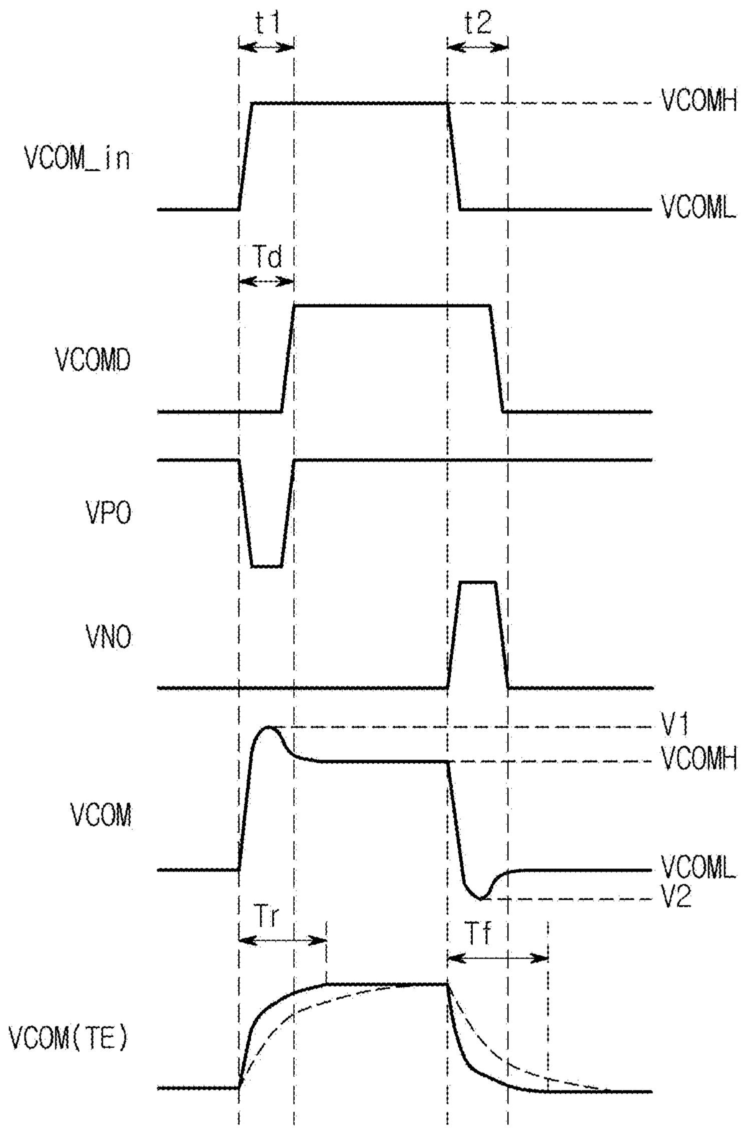
FIG. 14 is a view illustrating an example of an input signal and an output signal of a common voltage driving circuit illustrated in FIG. 6.

FIG. 14 is a view illustrating an example of an input signal and an output signal of the common voltage driving circuit illustrated in FIG. 6.

Referring to FIGS. 6 and 14 together, during the touch driving period, the input common voltage signal Vcom_in in the pulse form is applied to the common voltage driving circuit 21. In an embodiment, the input common voltage signal Vcom_in may be a square wave signal which swings between the high common voltage VcomH and the low common voltage VcomL, but is not limited thereto. The signal delay circuit 210 may output the delay signal VcomD by delaying the input common voltage signal Vcom_in by a predetermined delay time Td.

The delay time Td may be determined based on a size and resolution of the touch panel TSP (FIG. 1), a panel load of the touch panel TSP, and an operating speed and the like of the common voltage driving circuit 21. At this instance, the delay time Td may be set to be shorter than a pulse width (a non-transition zone, that is, a direct current zone) of the input common voltage signal Vcom_in. For example, the delay time Td may be set to be about 10% or less of the pulse width of the common voltage input signal Vcom_in, but is not limited thereto.

The comparator 220 may output a comparison signal VP0 and VN0 by comparing a delay signal VcomD output through the signal delay circuit 210 with the input common voltage signal Vcom_in. During a first interval t1 at which a voltage level of the delay signal VcomD is greater than a voltage level of the input common voltage signal Vcom_in, the first comparison signal VP0 at a low level is output. During a remaining other interval at which the voltage level of the delay signal VcomD is equal to or smaller than the voltage level of the input common voltage signal Vcom_in, the first comparison signal VP0 at a high level is output. During a second interval t2 at which the voltage level of the delay signal VcomD is smaller than the voltage level of the input common voltage signal Vcom_in, the second comparison signal VN0 at a high level is output. During a remaining other interval at which the voltage level of the delay signal VcomD is equal to or greater than the voltage level of the input common voltage signal Vcom_in, the second comparison signal VN0 at a low level is output.

The buffer 230 may output the high common voltage VcomH or the low common voltage VcomL to the output terminal in response to the comparison signal VP0 and VN0 output from the comparator 220. The first buffer transistor P0 of the buffer 230 is turned on in response to the first comparison signal VP0 being at a low level at the first interval t1. The high common voltage VcomH may be output to the output terminal through the first buffer transistor P0 which is turned on. The high common voltage VcomH output to the output terminal is summed with the input common voltage signal Vcom_in output to the output terminal and may be applied to the inverting input terminal (−) of the output circuit 240. The output circuit 240 may amplify a difference voltage between the sum voltage and the input common voltage signal Vcom_in by a predetermined amplifying ratio, and output the amplified difference voltage. Therefore, at the first interval t1, the common voltage signal Vcom output to the output terminal has a first voltage V1 greater than the high common voltage VcomH.

At the second interval t2, the second buffer transistor N0 is turned on in response to the second comparison signal VN0 being at the high level. The low common voltage VcomL may be output to the output terminal through the second buffer transistor N0 which is turned on. The low common voltage VcomL output to the output terminal is summed with the input common voltage signal Vcom_in output to the output terminal and may be applied to the inverting input terminal(−) of the output circuit 240. The output circuit 240 may amplify a difference voltage between the sum voltage and the input common voltage signal Vcom_in by a predetermined amplifying ratio, and output the amplified difference voltage. Therefore, at the second interval t2, the common voltage signal Vcom output to the output terminal has a second voltage V2 lower than the low common voltage VcomL.

As such, during the touch driving period, the common voltage signal Vcom is output in a form of the pulse which swings between the high common voltage VcomH and the low common voltage VcomL. At this instance, the common voltage signal Vcom has the first voltage V1 greater than the high common voltage VcomH at the predetermined first interval t1 after rising, and is stabilized as the high common voltage VcomH. In addition, the common voltage signal Vcom has the second voltage V2 smaller than the low common voltage VcomL at the predetermined second interval t2 after falling, and is stabilized as the low common voltage VcomL thereafter.

The touch electrode TE (FIG. 1) disposed in the touch panel receives the common voltage signal Vcom output from the common voltage driving circuit 21. At this instance, the touch electrode TE receives a signal having a substantially predetermined rising time delay Tr and falling time delay Tf, because of the panel load and/or the resistance element of the touch line TL and/or the touch panel TSP.

When the common voltage signal Vcom is applied in a form of the pulse signal which swings between the high common voltage VcomH and the low common voltage VcomL, the signal applied to the touch electrode TE has a signal having a substantially long rising time delay Tr and falling time delay Tf, as illustrated in a dotted line. On contrary, when the common voltage signal Vcom is applied as the first voltage V1 greater than the high common voltage VcomH at the first interval t1, a signal substantially applied to the touch electrode TE may be risen at a faster speed and may reach the high common voltage VcomH. In addition, when the common voltage signal Vcom is applied as the second voltage V2 smaller than the low common voltage VcomL at the second interval t2, the signal substantially applied to the touch electrode TE may be fallen at a faster speed, and may reach the low common voltage VcomL. As a result, through above-described embodiments, it is possible to implement a short rising time delay Tr and falling time delay Tf of the common voltage signal Vcom, with respect to the entire region or part of the region of the touch panel TSP having a great panel load, for example, with respect to the touch electrodes TE disposed far from the touch driving circuit 20.

The description herein has been presented to enable any person skilled in the art to make, use and practice the technical features of the present disclosure, and has been provided in the context of one or more particular example applications and their example requirements. Various modifications, additions and substitutions to the described embodiments will be readily apparent to those skilled in the art, and the principles described herein may be applied to other embodiments and applications without departing from the scope of the present disclosure. The description herein and the accompanying drawings provide examples of the technical features of the present disclosure for illustrative purposes. In other words, the disclosed embodiments are intended to illustrate the scope of the technical features of the present disclosure. Thus, the scope of the present disclosure is not limited to the embodiments shown, but is to be accorded the widest scope consistent with the claims. The scope of protection of the present disclosure should be construed based on the following claims, and all technical features within the scope of equivalents thereof should be construed as being included within the scope of the present disclosure.

What is claimed is:

1. An input sensing device, comprising:

at least one analog front end circuit configured to process touch sensing signals output from a plurality of touch electrodes and to generate a sampling signal;

an analog-digital converter configured to convert the sampling signal and to generate sensing data; and a common voltage driving circuit configured to apply a common voltage signal to the plurality of touch electrodes, wherein the common voltage driving circuit comprises:

a signal delay circuit configured to output a delay signal by delaying an input common voltage signal by a predetermined delay time;

a comparator configured to output a comparison signal by comparing the delay signal with the input common voltage signal;

a buffer configured to output a high common voltage or a low common voltage in response to the comparison signal; and an output circuit configured to amplify a signal output from the buffer by a predetermined ratio and to output the amplified signal as the common voltage signal to an output terminal, and wherein the comparator comprises:

a first comparator configured to output a first comparison signal at a first level when a voltage level of the delay signal is greater than a voltage level of the input common voltage signal and to output the first comparison signal at a second level when the voltage level of the delay signal is equal to or smaller than the voltage level of the input common voltage signal; and a second comparator configured to output a second comparison signal at the second level when the voltage level of the delay signal is smaller than the voltage level of the input common voltage signal and to output the second comparison signal at the first level when the voltage level of the delay signal is equal to or greater than the voltage level of the input common voltage signal.

2. The input sensing device of claim 1,
wherein the input common voltage signal swings between the high common voltage and the low common voltage during a touch driving period.

3. The input sensing device of claim 1,
wherein the signal delay circuit comprises:
at least two resistors connected in series between an input end and an output end; and
at least two capacitors connected in parallel between the input end and the output end.

4. The input sensing device of claim 1,
wherein the signal delay circuit comprises:
at least two transmission gates connected in series between an input end and an output end; and
at least two capacitors connected in parallel between the input end and the output end.

5. The input sensing device of claim 1,
wherein the signal delay circuit comprises:
a plurality of resistors connected in series to an input end;
a plurality of capacitors, each of which being connected between respective ones of the plurality of resistors;
a plurality of transmission gates, each of which being connected to a respective common node to which one corresponding capacitor among the plurality of capacitors and two adjacent corresponding resistors among the plurality of resistors being connected; and
a switching circuit configured to connect one transmission gate among the plurality of transmission gates to an output end.

6. The input sensing device of claim 1,
wherein the predetermined delay time is set to be shorter than a pulse width of the input common voltage signal.

7. The input sensing device of claim 1,
wherein the comparator is configured as an amplifying circuit or a dynamic circuit.

8. The input sensing device of claim 7,
wherein the amplifying circuit comprises:
an input circuit including a first transistor to which the delay signal being input through a gate node, a second transistor to which the input common voltage signal being input through a gate node, and a third transistor connected between a low potential voltage node and a common node of the first transistor and the second transistor; and
an amplifier configured to amplify a signal input through the first transistor and the second transistor and to output the amplified signal as the comparison signal.

9. The input sensing device of claim 8,
wherein in the first comparator, a size of the first transistor is set to be greater than a size of the second transistor, and
wherein in the second comparator, a size of the second transistor is set to be greater than a size of the first transistor.

10. The input sensing device of claim 1,
wherein the buffer comprises:
a first transistor configured to output the high common voltage to the output terminal in response to the first comparison signal being at the first level; and
a second transistor configured to output the low common voltage to the output terminal in response to the second comparison signal being at the second level.

11. The input sensing device of claim 10,
wherein the output circuit is configured as an amplifier having an inverting input terminal connected to the output terminal; and a non-inverting input terminal receiving the input common voltage signal, and configured to amplify a difference voltage between the inverting input terminal and the non-inverting input terminal to output the amplified difference voltage to the output terminal.

12. The input sensing device of claim 1,
wherein the input common voltage signal swings between the high common voltage and the low common voltage during a touch driving period, and
wherein the input common voltage signal is applied as a first voltage greater than the high common voltage during a predetermined first period after rising of a pulse and is applied as a second voltage lower than the low common voltage during a predetermined second period after falling of the pulse.

13. A display device, comprising:
a touch panel on which a plurality of touch electrodes are disposed; and
a touch driving circuit configured to process touch sensing signals output from the plurality of touch electrodes to generate a sampling signal,
wherein the touch driving circuit comprises:
a plurality of analog front end circuits configured to process the touch sensing signals and to generate the sampling signal;
an analog-digital converter configured to convert the sampling signal and to generate sensing data; and
a common voltage driving circuit configured to apply a common voltage signal to the plurality of touch electrodes,
wherein the common voltage driving circuit comprises:
a signal delay circuit configured to output a delay signal to an output terminal by delaying an input common voltage signal by a predetermined delay time;
a comparator configured to output a comparison signal by comparing the delay signal with the input common voltage signal;
a buffer configured to output a high common voltage or a low common voltage in response to the comparison signal; and
an output circuit configured to amplify a signal output from the buffer by a predetermined ratio and to output the amplified signal as the common voltage signal, and
wherein the comparator comprises:
a first comparator configured to output a first comparison signal at a first level when a voltage level of the delay signal is greater than a voltage level of the input common voltage signal and to output the first comparison signal at a second level when the voltage level of the delay signal is equal to or smaller than the voltage level of the input common voltage signal; and
a second comparator configured to output a second comparison signal at the second level when the voltage level of the delay signal is smaller than the voltage level of the input common voltage signal and to output the second comparison signal at the first level when the voltage level of the delay signal is equal to or greater than the voltage level of the input common voltage signal.

14. The display device of claim 13,
wherein the input common voltage signal swings between the high common voltage and the low common voltage during a touch driving period.

15. The display device of claim 13,
wherein the signal delay circuit comprises:
at least two resistors connected in series between an input end and an output end; and at least two capacitors connected in parallel between the input end and the output end.

16. The display device of claim 13, wherein the comparator comprises:

an input circuit including a first transistor to which the delay signal being input through a gate node, a second transistor to which the input common voltage signal being input through a gate node, and a third transistor connected between a common node of the first transistor and the second transistor and a low potential voltage node; and an amplifier configured to amplify a signal input through the first transistor and the second transistor and to output the amplified signal as the comparison signal, wherein in the first comparator, a size of the first transistor is set to be greater than a size of the second transistor, and wherein in the second comparator, a size of the second transistor is set to be greater than a size of the first transistor.

17. The display device of claim 13, wherein the buffer comprises:

a first transistor configured to output the high common voltage to the output terminal in response to the first comparison signal being at the first level; and a second transistor configured to output the low common voltage to the output terminal in response to the second comparison signal being at the second level.

18. The display device of claim 17, wherein the output circuit is configured as an amplifier having an inverting input terminal connected to the output terminal; and a non-inverting input terminal receiving the input common voltage signal, and configured to amplify a difference voltage between the inverting input terminal and the non-inverting input terminal to output the amplified difference voltage to the output terminal.

19. The display device of claim 13, wherein the input common voltage signal is applied in a form of a pulse which swings between the high common voltage and the low common voltage during a touch driving period, and wherein the input common voltage signal is applied as a first voltage greater than the high common voltage during a predetermined first period after rising of the pulse and is applied as a second voltage lower than the low common voltage during a predetermined second period after falling of the pulse.

* * * * *